(12) United States Patent
Mitsutani et al.

(10) Patent No.: US 9,738,274 B2
(45) Date of Patent: Aug. 22, 2017

(54) HYBRID VEHICLE

(71) Applicant: Toyota Jidosha Kabushiki Kaisha, Toyota-shi Aichi-ken (JP)

(72) Inventors: Noritake Mitsutani, Toyota (JP); Toshiya Hashimoto, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/061,013

(22) Filed: Mar. 4, 2016

(65) Prior Publication Data

US 2016/0257302 A1 Sep. 8, 2016

(30) Foreign Application Priority Data

Mar. 6, 2015 (JP) ................. 2015-045080

(51) Int. Cl.
*B60L 9/00* (2006.01)
*B60W 20/50* (2016.01)
(Continued)

(52) U.S. Cl.
CPC ............ *B60W 20/50* (2013.01); *B60K 6/365* (2013.01); *B60K 6/445* (2013.01); *B60K 6/48* (2013.01); *B60W 10/06* (2013.01); *B60W 10/08* (2013.01); *B60W 2400/00* (2013.01); *B60W 2510/083* (2013.01); *B60W 2710/06* (2013.01);
(Continued)

(58) Field of Classification Search
CPC ...... B60W 20/50; B60W 10/06; B60W 10/08; B60W 2400/00; B60W 2510/083; B60W 2710/06; B60W 2710/08; B60K 6/365; B60K 6/48; B60Y 2200/92; Y02T 10/6221; Y02T 10/6239; Y02T 10/6265;
(Continued)

(56) References Cited

U.S. PATENT DOCUMENTS

2006/0260853 A1* 11/2006 Ando ................. F02D 29/06
180/65.22
2008/0236913 A1* 10/2008 Ichimoto ............ B60K 6/365
180/65.265
(Continued)

FOREIGN PATENT DOCUMENTS

JP 2002-285905 A 10/2002
JP 2003-247441 A 9/2003
(Continued)

*Primary Examiner* — Shardul Patel
(74) *Attorney, Agent, or Firm* — Dinsmore & Shohl LLP

(57) ABSTRACT

An engine electronic control unit of a hybrid vehicle is configured to execute in-abnormality starting control for starting an engine when the engine is cranked in a state where abnormality occurs to communication between the engine electronic control unit and a hybrid electronic control unit. The hybrid electronic control unit is configured to execute in-abnormality cranking control for controlling the first motor such that the engine is cranked when the abnormality occurs to the communication between the engine electronic control unit and the hybrid electronic control unit. In addition, the hybrid electronic control unit is configured to execute in-abnormality electric travel control for controlling the second motor such that the hybrid vehicle travels only by power from the second motor when the in-abnormality cranking control is executed but the engine is not started.

6 Claims, 7 Drawing Sheets

(51) Int. Cl.
*B60W 10/06* (2006.01)
*B60W 10/08* (2006.01)
*B60K 6/48* (2007.10)
*B60K 6/365* (2007.10)
*B60K 6/445* (2007.10)

(52) U.S. Cl.
CPC ...... *B60W 2710/08* (2013.01); *B60Y 2200/92* (2013.01); *Y02T 10/6221* (2013.01); *Y02T 10/6239* (2013.01); *Y02T 10/6265* (2013.01); *Y02T 10/6286* (2013.01); *Y02T 10/7077* (2013.01); *Y10S 903/91* (2013.01); *Y10S 903/93* (2013.01)

(58) Field of Classification Search
CPC ............. Y02T 10/6286; Y02T 10/7077; Y10S 903/91; Y10S 903/93
USPC .......................................... 701/22; 180/65.28
See application file for complete search history.

(56) References Cited

U.S. PATENT DOCUMENTS

| | | | | |
|---|---|---|---|---|
| 2008/0296908 | A1* | 12/2008 | Utsumi | F02D 29/02 290/40 C |
| 2009/0025992 | A1* | 1/2009 | Hayashi | B60K 6/445 180/65.265 |
| 2010/0081541 | A1* | 4/2010 | Sugai | B60K 6/445 477/5 |
| 2010/0152940 | A1* | 6/2010 | Mitsutani | B60K 6/445 701/22 |
| 2012/0095630 | A1 | 4/2012 | Muto | |
| 2013/0238219 | A1* | 9/2013 | Ando | F02D 41/22 701/102 |

FOREIGN PATENT DOCUMENTS

| | | |
|---|---|---|
| JP | 2012-086591 A | 5/2012 |
| JP | 2014-205401 A | 10/2014 |

\* cited by examiner

HYBRID VEHICLE

INCORPORATION BY REFERENCE

The disclosure of Japanese Patent Application No. 2015-045080 filed on Mar. 6, 2015 including the specification, drawings and abstract is incorporated herein by reference in its entirety.

BACKGROUND OF THE INVENTION

1. Field of the Invention

The invention relates to a hybrid vehicle.

2. Description of Related Art

Conventionally, as a hybrid vehicle of this type, a hybrid vehicle that determines complete explosion of an engine when the engine is started from a stopped state and inhibits engine start thereafter when the complete explosion is determined to be impossible has been suggested (see Japanese Patent Application Publication No. 2003-247441 (JP 2003-247441 A), for example). In this hybrid vehicle, even when the complete explosion is determined to be impossible, a reason for incompleteness, such as a supply of excessively rich air-fuel mixture, may be temporal. For this reason, when the vehicle is stopped, the determination of impossibility of the complete explosion is cancelled, and inhibition of the engine start is also cancelled so as to secure an opportunity of restarting the engine.

In the hybrid vehicle, there is a case where the vehicle is controlled by using a hybrid electronic control unit that issues a drive command based on an operation by a driver and controls driving of a generator and a motor and an engine electronic control unit that controls an operation of the engine as separate components from each other. In this case, the hybrid electronic control unit and the engine electronic control unit transmit/receive the drive command and information therebetween via communication. However, when abnormality occurs to the communication between both of the electronic control units, the engine start or the like cannot appropriately be controlled.

SUMMARY OF THE INVENTION

The invention provides a hybrid vehicle that enables a travel along with further appropriate starting and operation control of an engine even when abnormality occurs to communication between a hybrid electronic control unit and an engine electronic control unit.

The hybrid vehicle of the invention includes an engine; a first motor that can crank the engine and generate electric power by using power of the engine; a second motor that outputs travel power; a battery that transmits/receives the electric power to/from the first motor and the second motor; a hybrid electronic control unit that sets a drive command for the engine, the first motor, and the second motor based on an operation by a driver and controls the first motor and the second motor based on the drive command; and an engine electronic control unit that communicates with the hybrid electronic control unit and controls the engine based on the drive command. The engine electronic control unit is a device that executes in-abnormality starting control for starting the engine when the engine is cranked in a state where abnormality occurs to communication with the hybrid electronic control unit. The hybrid electronic control unit is a device that executes in-abnormality cranking control for controlling the first motor such that the engine is cranked when abnormality occurs to communication with the engine electronic control unit and that executes in-abnormality electric travel control for controlling the second motor such that the hybrid vehicle travels only by power from the second motor when the engine is not started by the in-abnormality cranking control.

The hybrid vehicle of the invention includes: the hybrid electronic control unit that sets the drive command for the engine, the first motor, and the second motor based on the operation by the driver and controls the first motor and second motor based on the drive command; and the engine electronic control unit that controls the engine. The hybrid electronic control unit executes the in-abnormality cranking control for controlling the first motor such that the engine is cranked when the abnormality occurs to the communication with the engine electronic control unit. Meanwhile, the engine electronic control unit executes the in-abnormality starting control for starting the engine when the engine is cranked in the state where the abnormality occurs to the communication with the hybrid electronic control unit. In this way, when the abnormality does not occur to the hybrid electronic control unit and the engine electronic control unit as a cause of communication abnormality between the hybrid electronic control unit and the engine electronic control unit and the abnormality is communication blockage, for example, the engine can appropriately be started. In addition, the hybrid electronic control unit executes the in-abnormality electric travel control for controlling the second motor such that the hybrid vehicle travels only by the power from the second motor when the engine is not started by the in-abnormality cranking control. In the case where the cause of the communication abnormality between the hybrid electronic control unit and the engine electronic control unit is abnormality of the engine electronic control unit or the like, the engine is not started. However, also in this case, the hybrid vehicle can travel by using the power from the second motor. As a result, even when the abnormality occurs to the communication between the hybrid electronic control unit and the engine electronic control unit, the hybrid vehicle can travel along with further appropriate starting and operation control of the engine.

In such a hybrid vehicle of the invention, the hybrid electronic control unit may be a device that determines that the engine is not started and executes the in-abnormality electric travel control in the case where a rotational speed of the first motor is at least changed by a specified rotational speed in a direction to reduce a speed of the engine when cranking torque of the first motor is reduced after the in-abnormality cranking control. This is based on a fact that, when the engine is appropriately started, the speed of the engine is kept by control by the engine electronic control unit even after the cranking torque by the first motor is reduced.

In the hybrid vehicle of the invention, the hybrid electronic control unit may be a device that determines that the engine is started in the case where the rotational speed of the first motor is maintained when the cranking torque of the first motor is reduced after the in-abnormality cranking control, and that executes in-abnormality hybrid travel control for controlling the first motor and the second motor such that the hybrid vehicle travels along with electric power generation by the first motor by applying a load within a specified range to the engine. In this way, because the hybrid vehicle can travel along with the electric power generation by the first motor, a distance that can be travelled (a retreat travel distance) can be extended. Here, as the "specified range", a relatively small load range of a load range in which the load can act on the engine, for example, a range of at most equal to 20%, a range of at most equal to 10% of a maximum load that can act on the engine, or the like can be used.

Furthermore, in the hybrid vehicle of the invention, the engine electronic control unit may be a device that controls the engine such that the engine is operated at a specified speed when the engine is started by execution of the in-abnormality starting control. Here, as the "specified speed", a relatively low speed at which the engine can stably be operated, for example, 1200 rpm, 1500 rpm, 2000 rpm, or the like can be used. In this way, the engine can stably be operated. In this case, when the engine is started by the execution of the in-abnormality starting control, the engine electronic control unit may be a device that controls the engine within a range that is lower than a specified throttle opening degree. In this way, the engine can stably be operated even in the case where the electric power is generated by the first motor by applying the relatively low load to the engine.

In the hybrid vehicle of the invention, a planetary gear with three rotation elements which are connected to a rotational shaft of the first motor, an output shaft of the engine, and a drive shaft coupled to an axle, is provided, and the second motor may be able to output/input power to/from the drive shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, a mode for carrying out the invention will be described by using an embodiment.

Figure 1:
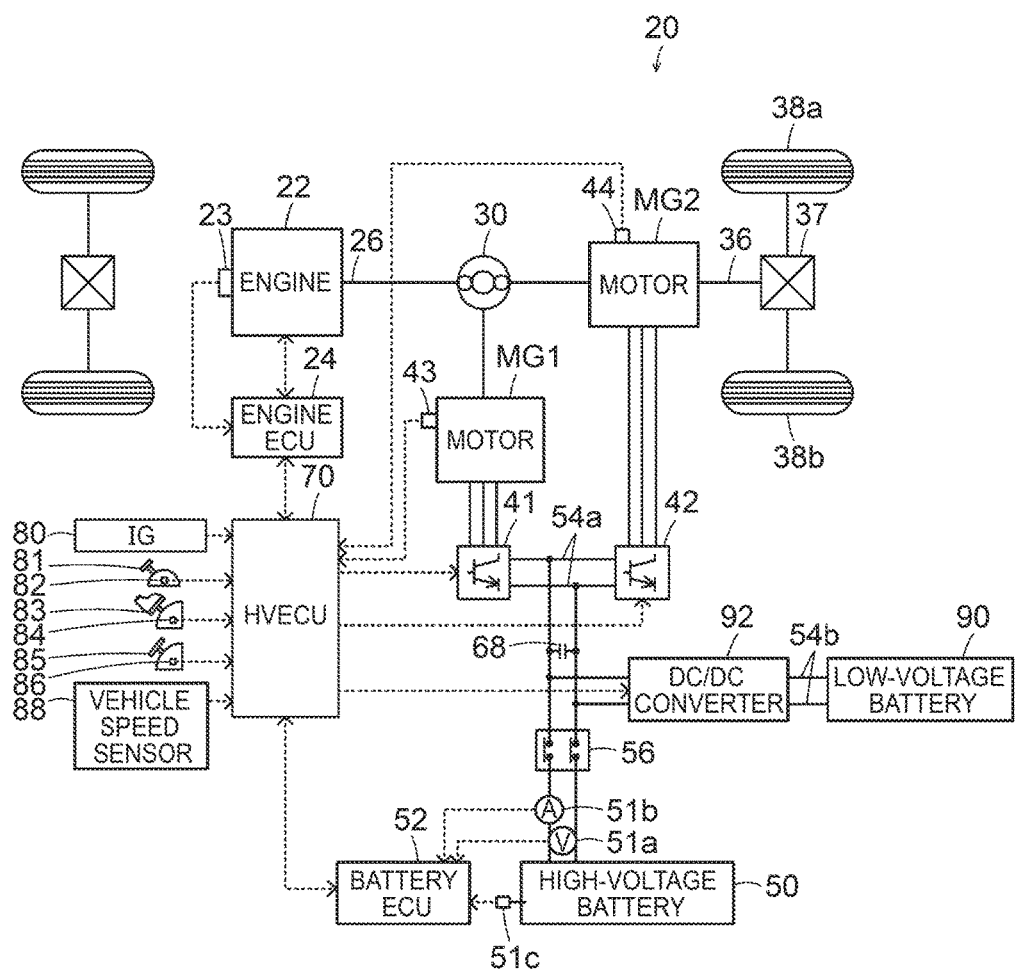
FIG. 1 is a configuration diagram for schematically showing a configuration of a hybrid vehicle 20 as an embodiment of the invention.

FIG. 1 is a configuration diagram for schematically showing a configuration of a hybrid vehicle 20 as the embodiment of the invention. As it is shown, the hybrid vehicle 20 of the embodiment includes an engine 22, a planetary gear 30, motors MG1, MG2, inverters 41, 42, a high-voltage battery 50, a system main relay 56, a low-voltage battery 90, a DC/DC converter 92, and a hybrid electronic control unit (hereinafter referred to as an "HVECU") 70.

The engine 22 is configured as an internal combustion engine that uses fuel, such as gasoline or diesel fuel, to output power. An operation of this engine 22 is controlled by an engine electronic control unit (hereinafter referred to as an "engine ECU") 24.

Although not shown, the engine ECU 24 is configured as a microprocessor that has a CPU as a central component, and includes, in addition to the CPU, a ROM for storing a process program, a RAM for temporarily storing data, input and output ports, and a communication port. The engine ECU 24 receives signals from various sensors that are required to control the operation of the engine 22 via the input port. The following can be raised as the signals from the various sensors: a crank angle θcr from a crank position sensor 23 that detects a rotation position of a crankshaft 26 of the engine 22; and a throttle opening degree TH from a throttle valve position sensor that detects a position of a throttle valve. Various control signals for controlling the operation of the engine 22 are output from the output port of the engine ECU 24. The following can be raised as the various control signals: a drive control signal to a throttle motor that adjusts the position of the throttle valve; a drive control signal to a fuel injection valve; and a drive control signal to an ignition coil that is integrated with an igniter. The engine ECU 24 is connected to the HVECU 70 via a communication port. This engine ECU 24 receives a drive command from the HVECU 70 and thereby controls the operation of the engine 22. In addition, the engine ECU 24 outputs data on an operation state of the engine 22 to the HVECU 70 when necessary. The engine ECU 24 computes a rotational speed of the crankshaft 26, that is, a speed Ne of the engine 22 based on the crank angle θcr from the crank position sensor 23.

The planetary gear 30 is configured as a planetary gear mechanism of a single pinion type. A rotor of the motor MG1 is connected to a sun gear of the planetary gear 30. A drive shaft 36 that is coupled to drive wheels 38a, 38b via a differential gear 37 is connected to a ring gear of the planetary gear 30. The crankshaft 26 of the engine 22 is connected to a carrier of the planetary gear 30.

The motor MG1 is configured as a synchronous generator motor, for example. As described above, the rotor of this motor MG1 is connected to the sun gear of the planetary gear 30. The motor MG2 is configured as a synchronous generator motor, for example. A rotor of this motor MG2 is connected to the drive shaft 36. The inverters 41, 42 are configured as well-known inverter circuits that respectively drive the motors MG1, MG2. These inverters 41, 42 are each connected to the high-voltage battery 50 by a high-voltage system power line 54a. Here, a smoothing capacitor 68 is connected to this high-voltage system power line 54a. The motors MG1, MG2 are rotationally driven when plural switching elements, which are not shown, of the inverters 41, 42 are subjected to switching control by the HVECU 70.

The high-voltage battery 50 is configured as a lithium-ion secondary battery or a nickel hydrogen secondary battery, for example. As described above, this high-voltage battery 50 is connected to the inverters 41, 42 by the high-voltage system power line 54a. The high-voltage battery 50 is managed by a battery electronic control unit (hereinafter referred to as a "battery ECU") 52.

The system main relay 56 is provided on the high-voltage battery 50 side of the high-voltage system power line 54a in relation to the capacitor 68 and the DC/DC converter 92 and connects/disconnects the inverters 41, 42 and/from the high-voltage battery 50.

Although not shown, the battery ECU 52 is configured as a microprocessor that has a CPU as a central component, and includes, in addition to the CPU, a ROM for storing a process program, a RAM for temporarily storing data, input/output ports, and a communication port. The battery ECU 52 receives signals from various sensors that are required to manage the high-voltage battery 50 via the input port. The following can be raised as the signals from the various sensors: a battery voltage Vb from a voltage sensor 51a that is installed between terminals of the high-voltage battery 50; a battery current Ib from a current sensor 51b that is attached to the output terminal of the high-voltage battery 50; and a battery temperature Tb from a temperature sensor 51c that is attached to the high-voltage battery 50. The battery ECU 52 is connected to the HVECU 70 via a communication port. This battery ECU 52 outputs data on a state of the high-voltage battery 50 to the HVECU 70 when necessary. The battery ECU 52 computes a state of charge SOC based on an integrated value of the battery current Ib from the current sensor 51b. The state of charge SOC is a ratio of power capacity that can be discharged from the high-voltage battery 50 to total capacity of the high-voltage battery 50. The battery ECU 52 also computes input/output limits Win, Wout based on the computed state of charge SOC and the battery temperature Tb from the temperature sensor 51c. The input/output limits Win, Wout are magnitudes of maximum permissible power that can be charged/discharged in/from the high-voltage battery 50, respectively.

The low-voltage battery 90 is configured as a lead storage battery, for example, and is connected to a low-voltage system power line 54b. The DC/DC converter 92 is connected to the inverters 41, 42 side of the high-voltage system power line 54a from the system main relay 56 and is also connected to the low-voltage system power line 54b. This DC/DC converter 92 is controlled by the HVECU 70. Accordingly, the DC/DC converter 92 reduces power on the high-voltage system power line 54a to supply the reduced power to the low-voltage system power line 54b, and increases power on the low-voltage system power line 54b to supply the increased power to the high-voltage system power line 54a. It should be noted that the engine ECU 24, the battery ECU 52, and the HVECU 70 each receives power supply from the low-voltage battery 90 for actuation.

Although not shown, the HVECU 70 is configured as a microprocessor that has a CPU as a central component, and includes, in addition to the CPU, a ROM for storing a process program, a RAM for temporarily storing data, input/output ports, and a communication port. The HVECU 70 receives signals from various sensors via the input port. The following can be raised as the signals from the various sensors: rotation positions θm1, θm2 from rotation position detection sensors 43, 44 that respectively detect rotation positions of the rotors of the motors MG1, MG2; a phase current from a current sensor that detects a current flowing through each phase of the motors MG1, MG2; an ignition signal from an ignition switch 80; a shift position SP from a shift position sensor 82 that detects an operation position of a shift lever 81; an accelerator pedal operation amount Acc from an accelerator pedal position sensor 84 that detects an depression amount of an accelerator pedal 83; a brake pedal position BP from a brake pedal position sensor 86 that detects a depression amount of a brake pedal 85; and a vehicle speed V from a vehicle speed sensor 88. Various control signals from the HVECU 70 are output via the output port. The following can be raised as the various control signals: a switching control signal for each of the switching elements, which are not shown, of the inverters 41, 42; a drive control signal to the system main relay 56; and a drive control signal to the DC/DC converter 92. As described above, the HVECU 70 is connected to the engine ECU 24 and the battery ECU 52 via the communication ports. This HVECU 70 transmits/receives the various control signals and the data to/from of the engine ECU 24 and the battery ECU 52. In addition, the HVECU 70 computes rotational speeds Nm1, Nm2 of the motors MG1, MG2 based on the rotation positions θm1, θm2 of the rotors of the motors MG1, MG2 from the rotation position detection sensors 43, 44.

The hybrid vehicle 20 of the embodiment that is configured as described above travels in travel modes, such as a hybrid travel mode (an HV travel mode) and an electric travel mode (an EV travel mode). The HV travel mode is a travel mode in which the vehicle travels by a combination of the operation of the engine 22 and driving of the motors MG1, MG2. The EV travel mode is a travel mode in which the vehicle runs by stopping the operation of the engine 22 and driving the motor MG2.

During a travel in the HV travel mode, the HVECU 70 first sets requested torque Tr* that is requested for the travel (should be output to the drive shaft 36) based on the accelerator pedal operation amount Acc from the accelerator pedal position sensor 84 and the vehicle speed V from the vehicle speed sensor 88. Next, travel power Pdrv* that is requested for the travel is calculated by multiplying the set requested torque Tr* by a rotational speed Nr of the drive shaft 36. Here, as the rotational speed Nr of the drive shaft 36, the rotational speed Nm2 of the motor MG2, a rotational speed that is obtained by multiplying the vehicle speed V by a conversion factor, or the like can be used. Then, requested power Pe* that is requested to the vehicle is set by subtracting charging/discharging requested power Pb* of the high-voltage battery 50 (that has a positive value when electric power is discharged from the high-voltage battery 50) from the calculated travel power Pdrv*. Next, a target speed Ne* and target torque Te* of the engine 22 and torque commands Tm1*, Tm2* of the motors MG1, MG2 are set as the drive commands such that the requested power Pe* is output from the engine 22 and the requested torque Tr* is output to the drive shaft 36 within ranges of the input/output limits Win, Wout of the high-voltage battery 50. Then, switching control of the switching elements of the inverters 41, 42 is performed such that the motors MG1, MG2 are driven at the torque commands Tm1*, Tm2*, and the target speed Ne* and the target torque Te* of the engine 22 is transmitted to the engine ECU 24. When receiving the target speed Ne* and the target torque Te* of the engine 22 as the drive commands, the engine ECU 24 executes intake air amount control, fuel injection control, ignition control, and the like of the engine 22 such that the engine 22 is operated based on the received target speed Ne* and target torque Te*. During a travel in this HV travel mode, it is determined that a stop condition of the engine 22 is established when the requested power Pe* becomes at most equal to a stop threshold Pstop or the like. Then, the operation of the engine 22 is stopped, and the travel mode of the vehicle is shifted to the EV travel mode.

The engine 22 is started when the engine 22 is cranked by the motor MG1 while the electric power is transmitted and received between the high-voltage battery 50 and the motor MG1, and operation control (the fuel injection control and the ignition control) of the engine 22 is initiated at a time when the speed Ne of the engine 22 becomes at least equal to a threshold speed (for example, 800 rpm, 900 rpm, 1000 rpm, or the like). When the engine 22 is cranked, cranking torque for cranking the engine 22 is output from the motor MG1, and, in conjunction with output of this cranking torque, canceling torque for canceling torque that acts on the drive shaft 36 is output from the motor MG2. It should be noted that drive control of the motor MG2 is also executed during starting of this engine 22 such that the requested torque Tr* is output to the drive shaft 36.

During the travel in the EV travel mode, similar to the HV travel mode, the HVECU 70 first sets the requested torque Tr*. Next, a value of the torque command Tm1* of the motor MG1 is set to 0. Then, the torque command Tm2* of the motor MG2 is set such that the requested torque Tr* is output to the drive shaft 36 within the ranges of the input/output limits Win, Wout of the high-voltage battery 50. The switching control of the switching elements of the inverters 41, 42 is then performed such that the motors MG1, MG2 are driven at the torque commands Tm1*, Tm2*. During the travel in this EV travel mode, similar to the HV travel mode, the requested power Pe* is calculated. Then, it is determined that a start condition of the engine 22 is established when this requested power Pe* becomes at least equal to a start threshold Pstart that is higher than the stop threshold Pstop, or the like. Thereafter, the engine 22 is started, and the travel mode of the vehicle is shifted to the HV travel mode.

Figure 2:
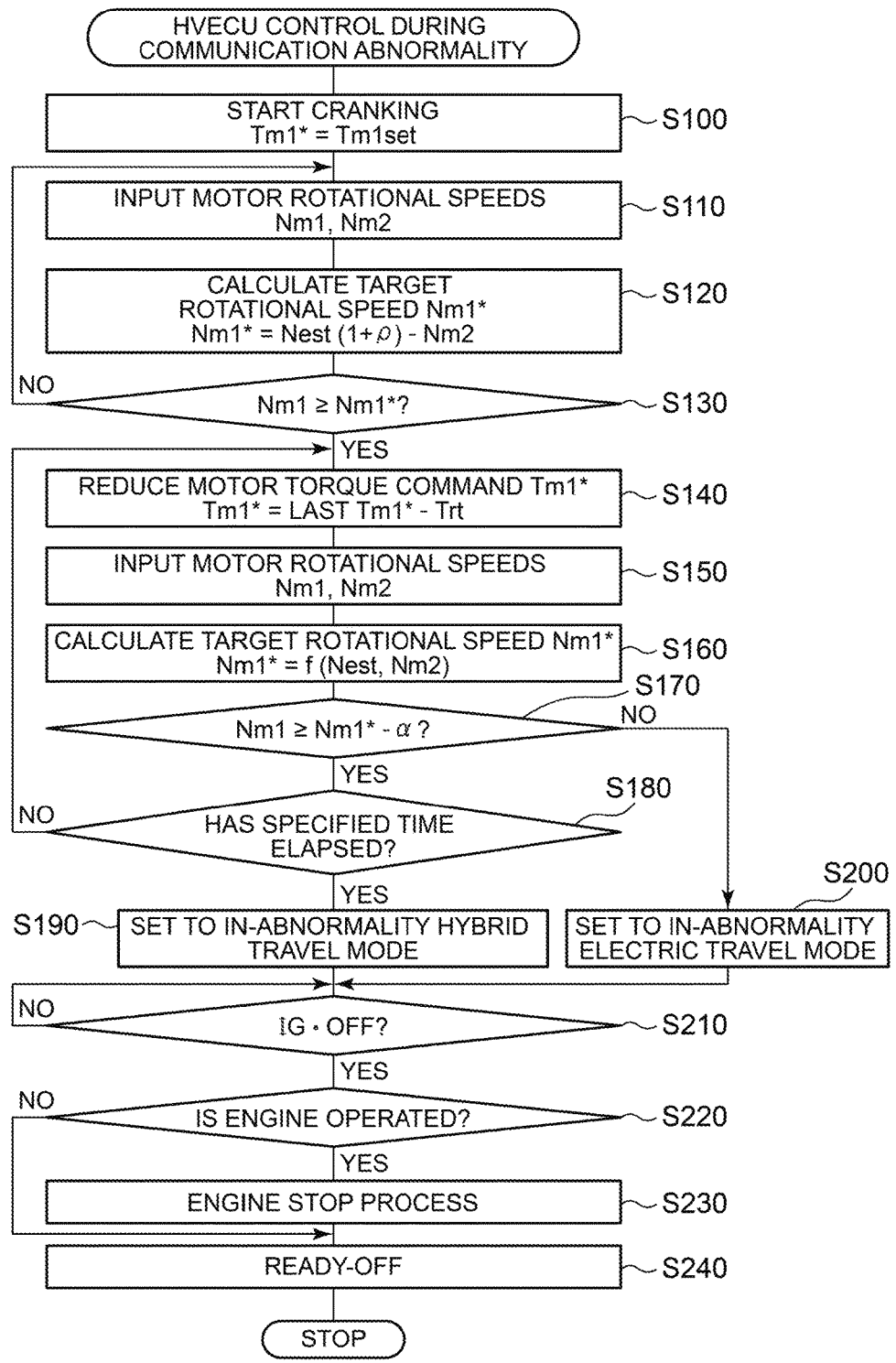
FIG. 2 is a flowchart that illustrates one example of HVECU control during communication abnormality that is executed by an HVECU 70.
Figure 3:
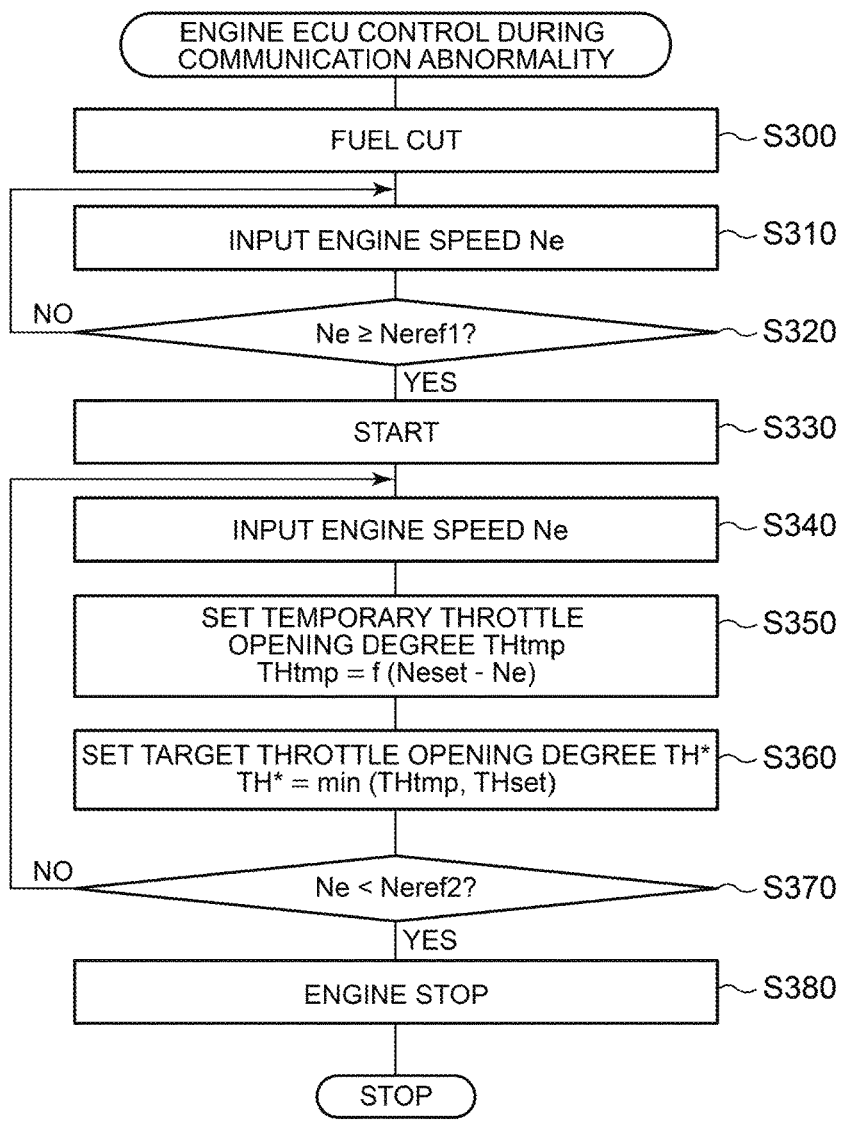
FIG. 3 is a flowchart that illustrates one example of engine ECU control during communication abnormality that is executed by an engine ECU 24.

Next, an operation of the hybrid vehicle 20 of the embodiment that is configured as described above, in particular, the operation thereof at a time when communication abnormality occurs between the HVECU 70 and the engine ECU 24 will be described. FIG. 2 is a flowchart that illustrates one example of HVECU control during communication abnormality that is executed by the HVECU 70 when abnormality occurs to the communication between the HVECU 70 and the engine ECU 24. FIG. 3 is a flowchart that illustrates one example of engine ECU control during communication abnormality that is executed by the engine ECU 24 when the abnormality occurs to the communication between the HVECU 70 and the engine ECU 24. For ease of description, the engine ECU control during communication abnormality will first be described by using FIG. 3. Then, the HVECU control during communication abnormality will be described by using FIG. 2.

As shown in the engine ECU control during communication abnormality in FIG. 3, when the abnormality occurs to the communication with the HVECU 70, the engine ECU 24 first cuts fuel to the engine 22 (step S300) and stops the operation of the engine 22. Then, the engine ECU 24 repeatedly executes a process for inputting the speed Ne of the engine 22 (step S310), and a process for determining whether the speed Ne of the engine 22 has become a threshold Neref1 (step S320) until the speed Ne of the engine 22 becomes at least equal to the threshold Neref1. Here, the threshold Neref1 is a threshold that is used to determine whether cranking by the motor MG1 is performed, and 300 rpm, 400 rpm, or the like can be used therefor, for example. As will be described below, when the abnormality occurs to the communication between the HVECU 70 and the engine ECU 24, the HVECU 70 executes a process for cranking the engine 22 by the motor MG1. Thus, the processes in these steps S310, S320 are the ones which are performed before such cranking.

When it is determined that the speed Ne of the engine 22 is at least equal to the threshold Neref1, the engine 22 is started by initiating the fuel injection control, the ignition control, and the intake air amount control (step S330). Once the engine 22 is started, the operation of the engine 22 is controlled such that the speed Ne of the engine 22 becomes a specified speed Neset within a range of the throttle opening degree TH that is at most equal to a specified opening degree THset (steps S340 to S360) until it is determined that the speed Ne of the engine 22 becomes lower than a threshold Neref2 (step S370). More specifically, the engine ECU 24 repeatedly executes a process for inputting the speed Ne of the engine 22 (step S340), a process for setting a temporary throttle opening degree THtmp by feedback control, for example, such that a difference between the speed Ne of the engine 22 and the specified speed Neset becomes small (step S350), a process for setting smaller one of the temporary throttle opening degree THtmp and the specified opening degree THset as a target throttle opening degree TH* (step S360), and a process for determining whether the speed Ne of the engine 22 has become lower than the threshold Neref2 (step S370). Here, the specified opening degree THset is defined in advance as a throttle opening degree in such a degree that torque in such a degree to bring the engine 22 to generate the specified speed Neset, for example, torque of 20%, 10%, or the like of maximum torque can be output. As the specified speed Neset, a relatively low speed at which the engine 22 can stably be operated, for example, 1200 rpm, 1500 rpm, 2000 rpm, or the like can be used. As described above, the operation of the engine 22 is controlled such that the speed Ne of the engine 22 becomes the specified speed Neset within the range in which the throttle opening degree TH becomes at most equal to the specified opening degree THset. In this way, the motor MG1 can generate the electric power by using the torque from the engine 22.

When it is determined in step S370 that the speed Ne of the engine 22 is lower than the threshold Neref2, the fuel injection control, the ignition control, the intake air amount control and the like are stopped so as to stop the operation of the engine 22 (step S380). Then, this routine is terminated. Here, the threshold Neref2 is set as a value that is sufficiently lower than the specified speed Neset even with consideration of a variation in the speed that is made at a time when the speed Ne of the engine 22 is kept at the specified speed Neset by the feedback control. Accordingly, in order to bring the speed Ne of the engine 22 to be lower than the threshold Neref2, a significant magnitude of negative torque has to act on the engine 22 from the motor MG1 so as to reduce the speed Ne of the engine 22. That is, the motor MG1 is controlled such that the significant magnitude of the negative torque is output from the motor MG1 to reduce the speed Ne of the engine 22. In this way, the speed Ne of the engine 22 becomes lower than the threshold Neref2, and the operation of the engine 22 can thereby be stopped.

Next, an operation of the HVECU 70 at a time when the abnormality occurs to the communication between the HVECU 70 and the engine ECU 24 will be described by using the HVECU control during communication abnormality in FIG. 2. It should be noted that, in this description, correlation with the above-described operation of the engine ECU control during communication abnormality by the engine ECU 24 will also be described when necessary.

Figure 4:
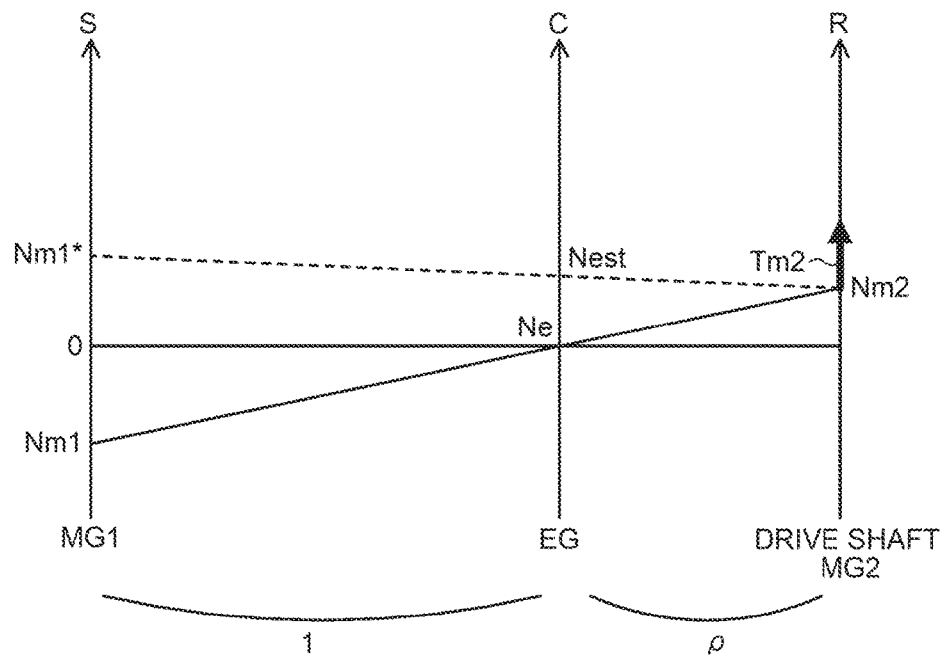
FIG. 4 is an explanatory view that illustrates one example in which a manner of calculating a target speed Nm1* from a speed Nest and a rotational speed Nm2 of a motor MG2 is expressed in a collinear diagram.

As shown in the HVECU control during communication abnormality in FIG. 2, when the abnormality occurs to the communication with the engine ECU 24, the HVECU 70 first sets torque Tm1set, which is the cranking torque, as the torque command Tm1* for the motor MG1 and starts cranking the engine 22 by the motor MG1 (step S100). Then, the HVECU 70 waits until the rotational speed Nm1 of the motor MG1 becomes at least equal to a target rotational speed Nm1* that is calculated as a speed Nest required for cranking of the engine 22 (steps S110 to S130). More specifically, the HVECU 70 repeatedly executes a process for inputting the rotational speeds Nm1, Nm2 of the motors MG1, MG2 (step S110), a process for calculating the target rotational speed Nm1* from the speed Nest that is required for cranking of the engine 22 and the rotational speed Nm2 of the motor MG2 (step S120), and a process for determining whether the rotational speed Nm1 of the motor MG1 has become at least equal to the target rotational speed Nm1* (step S130). Here, the target rotational speed Nm1* can be calculated by the following expression (1) when a gear ratio ρ (the number of teeth of the sun gear/the number of teeth of the ring gear) of the planetary gear 30 is used. It should be noted that the speed Nest is a rotational speed that is high enough to start the engine 22, and 1000 rpm, 1200 rpm, 1500 rpm, or the like can be used therefor, for example. One example in which a manner of calculating the target rotational speed Nm1* from the speed Nest and the rotational speed Nm2 of a motor MG2 is expressed in a collinear diagram is shown in FIG. 4. In the diagram, an S-axis on the left indicates a rotational speed of the sun gear as the rotational speed Nm1 of the motor MG1, a C-axis indicates a rotational speed of the carrier as the speed Ne of the engine 22, and an R-axis indicates a rotational speed of the ring gear as the rotational speed Nm2 of the motor MG2. A solid line indicates a state where the vehicle travels at the rotational speed Nm2 by torque Tm2 from the motor MG2 while the operation of the engine 22 is stopped. In addition, a broken line indicates a state where the engine 22 is cranked and rotates at the specified speed Neset. A bold arrow on the R-axis indicates the torque Tm2 that is output from the motor MG2. The expression (1) can easily be derived by using this collinear diagram. When the engine 22 is cranked by the motor MG1 in such a manner, in step S320 of the engine ECU control during communication abnormality in FIG. 3, it is determined that the speed Ne of the engine 22 has become at least equal to the threshold Neref1, and the engine 22 is started by the engine ECU 24.

$$Nm1^* = \{(1+\rho)Nest - Nm2\}/\rho \quad (1)$$

In the case where it is determined in step S130 that the rotational speed Nm1 of the motor MG1 has become at least equal to the target rotational speed Nm1*, a process is executed to determine whether the rotational speed of the motor MG1 is kept to be at least equal to a rotational speed that is slightly lower than the target rotational speed Nm1* even when the torque command Tm1* of the motor MG1 is gradually reduced (steps S140 to S180). More specifically, a process for reducing the torque command Tm1* of the motor MG1 by specified torque Trt (step S140), a process for inputting the rotational speeds Nm1, Nm2 of the motors MG1, MG2 (step S150), a process for calculating the target rotational speed Nm1* by using the speed Nest and the rotational speed Nm2 of the motor MG2 (step S160), a process for determining whether the rotational speed Nm1 of the motor MG1 is at least equal to a rotational speed (Nm1*−α) that is obtained by subtracting a specified rotational speed a from the target rotational speed Nm1* (step S170), and a process for determining whether a specified time has elapsed since the torque command Tm1* of the motor MG1 starts being reduced (step S180) are repeatedly executed until it is determined in step S170 that the rotational speed Nm1 of the motor MG1 is lower than the rotational speed (Nm1*−α) or it is determined in step S180 that the specified time has elapsed. Here, the specified torque Trt is torque that is subtracted from the torque command Tm1* so as to gradually reduce the torque command Tm1* of the motor MG1, and can be defined in accordance with a manner of reducing the torque command Tm1* or a frequency of repeating steps S140 to S180. The specified rotational speed a is set such that the rotational speed (Nm1*−α), which is obtained by subtracting the specified rotational speed a from the target rotational speed Nm1*, becomes sufficiently lower than the specified speed Neset that is obtained through the repeated processes in steps S340 to S370 of the engine ECU control during communication abnormality in FIG. 3. As the specified time, a time that is required to sufficiently reduce the torque command Tm1* of the motor MG1 can be used. The processes in steps S140 to S180 correspond to a process for determining that the rotational speed Nm1 of the motor MG1 is kept at a higher rotational speed than the rotational speed (Nm1*−α) even after the specified time elapses in the case where the engine 22 is started by the engine ECU 24 and the speed Ne of the engine 22 is controlled to be kept at the specified speed Neset. Meanwhile, in the case where the communication abnormality occurs between the HVECU 70 and the engine ECU 24 due to abnormality of the engine ECU 24, the engine ECU control during communication abnormality in FIG. 3 is not executed by the engine ECU 24 even when the cranking by the motor MG1 is performed, and thus the engine 22 is not started. Accordingly, when the torque command Tm1* of the motor MG1 is reduced, the rotational speed Nm1 of the motor MG1 is also reduced, and the rotational speed Nm1 of the motor MG1 becomes lower than the rotational speed (Nm1*−α) before the specified time elapses. Thus, the processes in steps S140 to S180 correspond to the process for determining that the engine 22 is not started due to the abnormality of the engine ECU 24.

Figure 5:
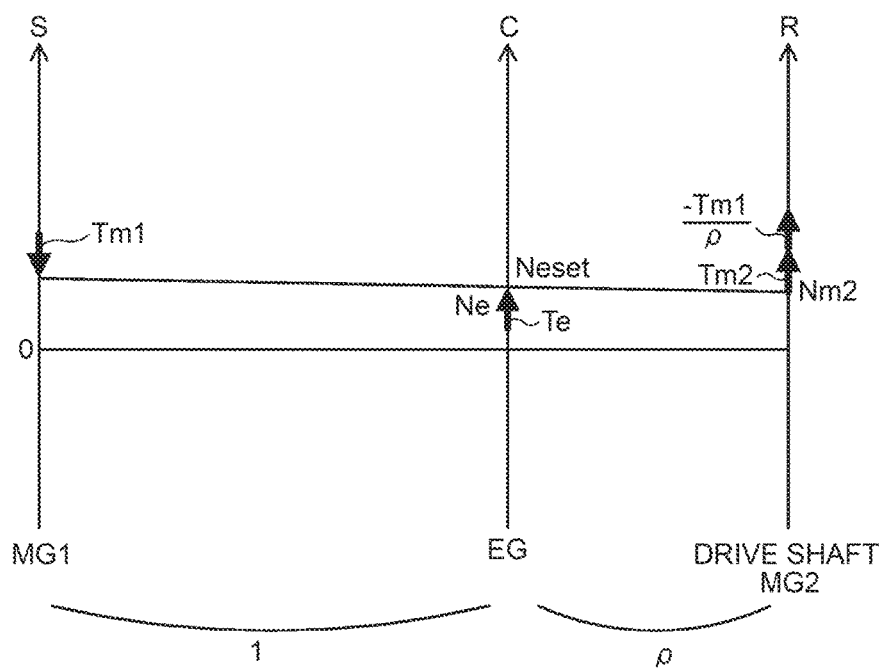
FIG. 5 is an explanatory view that illustrates one example of a collinear diagram that shows a travel state in an in-abnormality hybrid travel mode.

In the case where it is determined in steps S140 to S180 that the rotational speed Nm1 of the motor MG is kept at a higher rotational speed than the rotational speed (Nm1*−α) even after the specified time elapses, it is determined that the communication abnormality with the engine ECU 24 is simply a communication abnormality and thus no abnormality occurs to the engine ECU 24, and an in-abnormality hybrid travel mode is set (step S190). The in-abnormality hybrid travel mode is a travel mode in which the vehicle travels while a load within a relatively small specified range acts on the engine 22. In this mode, for example, the torque command Tm1* of the motor MG1 is set to be relatively low specified torque as electric power generation torque when the state of charge SOC of the battery 50 is lower than a value that is close to full charging (for example, 90% or the like), and the torque command Tm2* of the motor MG2 is set such that torque, a magnitude of which is as close as possible to that of the requested torque Tr* by the driver, is output to the drive shaft 36. The vehicle travels while being controlled in this way. In this case, even in the case where the relatively low specified torque for the electric power generation is set as the torque command Tm1* of the motor MG1, the engine ECU 24 controls the throttle opening degree TH such that the speed Ne of the engine 22 is kept at the specified speed Neset by the repeated processes of steps S340 to S370 of the engine ECU control during communication abnormality in FIG. 3 even when the load acts on the engine 22. Thus, the electric power can continuously be generated by the motor MG1 by using the power from the engine 22. One example of a collinear diagram in a state where the vehicle travels in the in-abnormality hybrid travel mode is shown in FIG. 5. As it is shown, torque Te is output from the engine 22, the electric power is generated by electric power generation torque Tm1 from the motor MG1, and the torque Tm2 is output from the motor MG2. As a result, total torque of torque that corresponds to torque Tm1 output from the motor MG1 and acting on the drive shaft 36 via the ring gear and the torque Tm2 that is output from the motor MG2 acts on the drive shaft 36. Because the in-abnormality hybrid travel mode is executed as described above, a travel distance during a retreat travel can be extended to be longer than a travel distance during the retreat travel in the electric travel mode by the electric power that can be obtained by the electric power generation by the motor MG1. Such a travel in the in-abnormality hybrid travel mode is continued until the ignition switch 80 is turned OFF.

On the other hand, when it is determined in steps S140 to S180 that the engine 22 is not started due to the abnormality of the engine ECU 24, an in-abnormality electric travel mode is set (step S200). The in-abnormality electric travel mode is practically the same as the electric travel mode. Thus, the retreat travel that corresponds to the state of charge SOC of the battery 50 can be made. Such a travel in the in-abnormality electric travel mode is continued until the ignition switch 80 is turned OFF.

Figure 6:
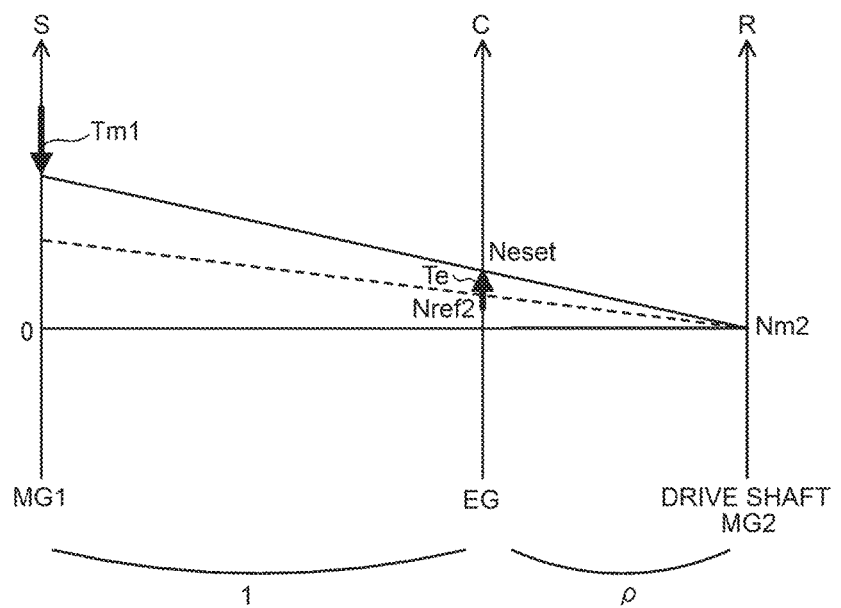
FIG. 6 is an explanatory view that illustrates one example of a collinear diagram when an operation of an engine 22 is stopped.

After the travel mode is set and the retreat travel is made as described above, the vehicle is stopped, and the ignition switch 80 is turned OFF. Then, it is confirmed in step S210 that the ignition switch is turned OFF, and it is determined whether the engine 22 is operated (step S220). The determination of whether the engine 22 is operated can be made by calculating the speed Ne of the engine 22 by using the rotational speeds Nm1, Nm2 of the motors MG1, MG2, and determining whether the speed Ne of the engine 22 is lower than the threshold speed that is lower than a normal idling speed, for example, 300 rpm or 200 rpm. That is, it is determined that the engine 22 is not operated if the speed Ne of the engine 22 is lower than the threshold speed, and it is determined that the engine 22 is operated if the speed Ne of the engine 22 is at least equal to the threshold speed. If it is determined that the engine 22 is operated, a process for stopping the operation of the engine 22 is executed (step S230), and ready-off of the hybrid vehicle 20 is executed along with a process for stopping a system such as turning off of the system main relay 56 (step S240). Then, this process is terminated. The process for stopping the operation of the engine 22 is executed by setting a relatively large magnitude of the negative torque as the torque command Tm1* of the motor MG1 for a certain time. When the relatively large magnitude of the negative torque is output from the motor MG1, the speed Ne of the engine 22 is reduced, and the speed Ne of the engine 22 becomes lower than the threshold Neref2. Then, the engine ECU 24 determines in step S370 of the engine ECU control during communication abnormality in FIG. 3 that the speed Ne of the engine 22 is lower than the threshold Neref2, and stops the fuel injection control, the ignition control, and the intake air amount control so as to stop the operation of the engine 22. In this way, the operation of the engine 22 can be stopped. One example of a collinear diagram at a time when the operation of the engine 22 is stopped is shown in FIG. 6. In the diagram, a solid line indicates a state where the speed Ne of the engine 22 is kept to be the specified rotational speed Neset, and a broken line indicates a state where the speed Ne of the engine 22 is reduced by the torque Tm1 of the motor MG1 and thereby reaches the threshold Neref2. Just as described, when the relatively large magnitude of the negative torque is output from the motor MG1, the speed Ne of the engine 22 can be reduced, and eventually the operation of the engine 22 can be stopped. On the other hand, if it is determined in step S220 that the engine 22 is not operated, the ready-off of the hybrid vehicle 20 is executed along with the process for stopping the system, such as turning off of the system main relay 56 (step S240), and this process is terminated.

Figure 7:
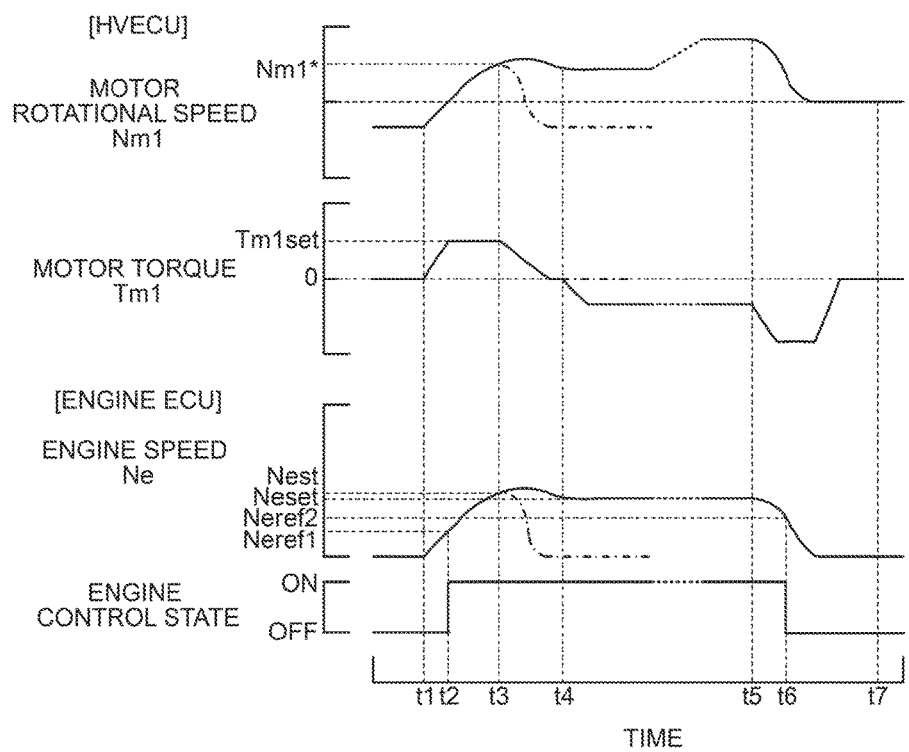
FIG. 7 is an explanatory chart that illustrates one example of temporal changes in a rotational speed Nm1 of a motor MG1, torque Tm1, a speed Ne of the engine 22, and a drive signal when abnormality occurs to communication between the HVECU 70 and the engine ECU 24 during a travel with the operation of the engine 22 being stopped.

FIG. 7 is an explanatory chart that illustrates one example of temporal changes in the rotational speed Nm1 of the motor MG1, the torque Tm1, the speed Ne of the engine 22, and a drive signal when the abnormality occurs to the communication between the HVECU 70 and the engine ECU 24 during the travel with the operation of the engine 22 being stopped. In the chart, solid lines indicate a state where the engine 22 can be started, and one-dot chain lines indicate a state where the engine 22 cannot be started. When the abnormality occurs to the communication between the HVECU 70 and the engine ECU 24 at time t1, in order to crank the engine 22, the HVECU 70 sets the torque Tm1 set for cranking as the torque command Tm1* of the motor MG1 and starts the cranking by the motor MG1. Due to this cranking, at time t2 at which the speed Ne of the engine 22 is increased and reaches the threshold Neref1, the engine ECU 24 starts the engine 22 and initiates the fuel injection control, the ignition control, the intake air amount control, and the like. In this way, a control state of the engine 22 becomes ON. Then, at time t3, the rotational speed Nm1 of the motor MG1 reaches the target rotational speed Nm1*, which is calculated by using the rotational speed Nm2 of the motor MG2 and the speed Nest of the engine 22 for cranking, due to the cranking, and the torque command Tm1* of the motor MG1 is gradually reduced. In the case where the engine 22 can be started, the engine 22 is controlled to be operated at the specified speed Neset by the engine ECU 24. Accordingly, even when the output torque Tm1 from the motor MG1 is reduced, the rotational speed Nm1 of the motor MG1 is not abruptly reduced from the target rotational speed Nm1*. Then, from time t4 after the starting of the engine 22 is confirmed to time t5 at which the ignition switch 80 is turned OFF, the negative torque for the electric power generation is set for the torque command Tm1* of the motor MG1 by the HVECU 70, and the electric power is generated by using the power from the engine 22. In addition, due to the feedback control of the throttle opening degree TH, the operation of the engine 22 is controlled by the engine ECU 24 such that the speed Ne of the engine 22 is kept to be the specified speed Neset even when the load by the motor MG1 acts on the engine 22. When the vehicle is stopped, and the ignition switch 80 is turned OFF at the time t5, the HVECU 70 sets the large magnitude of the negative torque for the torque command Tm1* of the motor MG1 so as to reduce the speed Ne of the engine 22. Then, the speed Ne of the engine 22 is reduced, and the speed Ne becomes lower than the threshold Neref2 at time t6. At the time, the engine ECU 24 stops the fuel injection control, the ignition control, and the intake air amount control so as to stop the engine 22. In this way, the control state of the engine 22 becomes OFF. At time t7 after values of the rotational speed Nm1 of the motor MG1 and the speed Ne of the engine 22 each become 0, the ready-off of the hybrid vehicle 20 is executed by turning off the system main relay 56 and the like.

In the hybrid vehicle 20 of the embodiment that has been described so far, in the case where the abnormality occurs to the communication between the HVECU 70 and the engine ECU 24, the engine ECU 24 determines that the engine 22 is cranked when the speed Ne of the engine 22 becomes at least equal to the threshold Neref1, and controls the engine 22 for starting. Meanwhile, the HVECU 70 controls the motor MG1 to crank the engine 22, and thereafter gradually reduces the cranking torque of the motor MG1. At this time, in the case where the rotational speed Nm1 of the motor MG1 is kept to be at least equal to the rotational speed (Nm1*−α), which is obtained by subtracting the rotational speed a from the target rotational speed Nm1*, the abnormality is simply the communication abnormality, and it is thus determined that the engine 22 could be started. On the other hand, in the case where the rotational speed Nm1 becomes lower than the rotational speed (Nm1*−α), it is determined that the engine 22 could not be started due to the abnormality of the engine ECU 24. Accordingly, in the case where the abnormality does not occur to the HVECU 70 and the engine ECU 24 as a cause of the communication abnormality between the HVECU 70 and the engine ECU 24 and the abnormality is simply the communication abnormality such as communication blockage, the engine 22 can appropriately be started. Then, when the engine 22 could be started, the vehicle travels in the in-abnormality hybrid travel mode, in which the vehicle travels while the electric power is generated by the motor MG1 by applying the relatively low load to the engine 22. In this way, the travel distance can be extended compared to the retreat travel in which only the electric power is used for the travel. In addition, when it is determined that the engine 22 could not be started, the vehicle travels in the in-abnormality electric travel mode that is similar to the normal electric travel mode. In this way, the retreat travel can appropriately be made. As a result of these, even when the abnormality occurs to the communication between the HVECU 70 and the engine ECU 24, the vehicle can travel along with further appropriate starting and the operation control of the engine 22.

In the hybrid vehicle 20 of the embodiment, in the case where the engine 22 is started when the abnormality occurs to the communication between the HVECU 70 and the engine ECU 24, the operation of the engine 22 is controlled by the engine ECU 24 such that the speed Ne of the engine 22 is kept to be the specified speed Neset within the range of the throttle opening degree TH that is at most equal to the specified opening degree THset. However, the speed Ne of the engine 22 may not be kept to be the specified speed Neset. For example, the speed Ne of the engine 22 may be controlled such that the speed Ne of the engine 22 is increased as the state of charge SOC of the battery 50 is reduced. In this case, the throttle opening degree TH may not fall within the range of the specified opening degree THset. For example, the throttle opening degree TH may be controlled to fall within a range of the larger throttle opening degree as the speed Ne of the engine 22 is increased.

Figure 8:
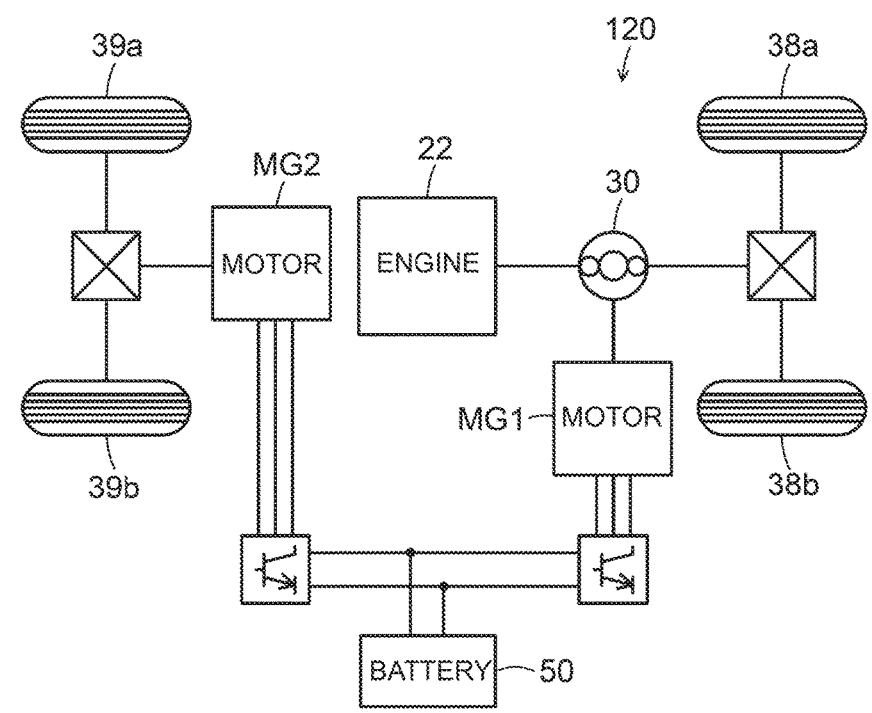
FIG. 8 is a configuration diagram for schematically showing a configuration of a hybrid vehicle 120 of a modified example.

In the hybrid vehicle 20 of the embodiment, the power from the motor MG2 is output to the drive shaft 36 that is connected to the drive wheels 38a, 38b. However, as exemplified in a hybrid vehicle 120 of a modified example in FIG. 8, the power from the motor MG2 may be output to an axle (an axle connected to wheels 39a, 39b in FIG. 8) that differs from an axle to which the drive shaft 36 is connected (an axle connected to the drive wheels 38a, 38b).

In the embodiment, the invention is applied to the hybrid vehicle 20, in which the engine 22, the motor MG1, and the motor MG2 are connected to three rotation elements of the planetary gear 30. However, the invention can also be applied to a hybrid vehicle with any type of configuration as long as the hybrid vehicle has: an engine; a first motor that can crank the engine and can generate electric power by using power from the engine; and a second motor that outputs travel power. For example, the invention may also be applied to a so-called series hybrid vehicle.

Corresponding relationships between main elements of the embodiment and main elements of the invention will be described. In the embodiment, the engine 22 is one example of the "engine", the motor MG1 is one example of the "first motor", the motor MG2 is one example of the "second motor", the battery 50 is one example of the "battery", the HVECU 70 is one example of the "hybrid electronic control unit", and the engine ECU 24 is one example of the "engine electronic control unit".

It should be noted that, because the above corresponding relationships are merely the examples for specifically describing the mode for carrying out the invention, the above corresponding relationships do not limit the elements of the invention. The embodiment is merely one specific example of the invention.

The invention has been described so far by using the embodiment. The invention is not limited to such an embodiment in any way. It is needless to say that the invention can be implemented in various modes within the scope that does not depart from the gist of the invention.

The invention can be used for a hybrid vehicle manufacturing industry and the like.

What is claimed is:

1. A hybrid vehicle driven by a driver, the hybrid vehicle comprising:

an engine;

a first motor configured to be able to crank the engine, the first motor configured to be able to generate electric power by using power of the engine;

a second motor configured to output travel power;

a battery configured to transmit the electric power to the first motor and the second motor and receive the electric power from the first motor and the second motor;

a hybrid electronic control unit configured to set a drive command for the engine, the first motor, and the second motor based on of an operation by the driver, the hybrid electronic control unit configured to control the first motor and the second motor based on the drive commands; and an engine electronic control unit configured to communicate with the hybrid electronic control unit, the engine electronic control unit configured to control the engine based on the drive command, wherein the engine electronic control unit is configured to execute in-abnormality starting control for starting the engine, when the engine is cranked in a state where an abnormality occurs in communication between the engine electronic control unit and the hybrid electronic control unit, and the hybrid electronic control unit is configured to execute in-abnormality cranking control for controlling the first motor such that the engine is cranked, when the abnormality occurs in communication between the engine electronic control unit and the hybrid electronic control unit, and the hybrid electronic control unit is configured to execute in-abnormality electric travel control for controlling the second motor such that the hybrid vehicle travels only by power from the second motor, when the in-abnormality cranking control is executed but the engine is not started.

2. The hybrid vehicle according to claim 1, wherein
the hybrid electronic control unit is configured to execute the in-abnormality electric travel control when cranking torque of the first motor is reduced after the in-abnormality cranking control and a rotational speed of the first motor is at least changed by a specified rotational speed in a direction to reduce a speed of the engine.

3. The hybrid vehicle according to claim 1, wherein
the hybrid electronic control unit is configured to execute in-abnormality hybrid travel control when the cranking torque of the first motor is reduced after the in-abnormality cranking control and the rotational speed of the first motor is maintained, and the hybrid electronic control unit is, in the in-abnormality hybrid travel control, configured to control the first motor and the second motor such that the hybrid vehicle travels along with electric power generation by the first motor caused by applying a load within a specified range to the engine.

4. The hybrid vehicle according to claim 1, wherein
the engine electronic control unit is configured to control the engine such that the engine is operated at a specified speed when the engine is started by execution of the in-abnormality starting control.

5. The hybrid vehicle according to claim 4, wherein
the engine electronic control unit is configured to control the engine within a range that is lower than a specified throttle opening degree when the engine is started by the execution of the in-abnormality starting control.

6. The hybrid vehicle according to claim 1, wherein
a planetary gear with three rotation elements which are connected to a rotational shaft of the first motor, an output shaft of the engine, and a drive shaft coupled to an axle, is provided, and the second motor is able to output power to the drive shaft and input power from the drive shaft.

\* \* \* \* \*